United States Patent Office 2,993,073
Patented July 18, 1961

2,993,073
DERIVATIVES OF p-HALOPHENOL
George G. Roller and Earl D. Holly, Midland, Mich., assignors to The Dow Chemical Company, Midland, Mich., a corporation of Delaware
No Drawing. Filed Sept. 8, 1958, Ser. No. 759,395
2 Claims. (Cl. 260—591)

This invention relates to organic chemical compounds which are acyl-benzoyl derivatives of a p-halophenol, and to a method for the preparation of these compounds.

These acyl-benzoyl derivatives of a p-halophenol have the formula:

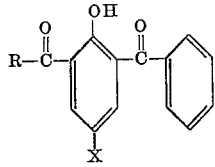

wherein X is a halogen, either chlorine or bromine, and R is a lower alkyl radical containing from 1 to 4 carbon atoms.

The compounds of the present invention are useful as light stabilizers when conventionally incorporated into a copolymer of 85 percent vinylidene chloride and 15 percent vinyl chloride (generally known as a Saran-type polymer).

Preparation of the compounds of the present invention is accomplished by molecular rearrangement of a material having the formula:

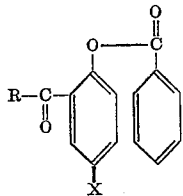

wherein X and R have the hereinbefore assigned values.

This starting material, 2-acyl-4-halophenyl benzoate, is mixed with aluminum chloride and the reaction mixture heated at a temperature above about 140° C. for at least 30 minutes. The maximum reaction temperature will be less than that temperature at which substantial decomposition of the reactant or reaction product occurs. Preferably the mixture is heated at about 155° C. for 30 minutes and thereafter heated at 185° C. for an additional one hour. Separation of the product is readily accomplished by cooling the reaction mixture, treating with aqueous hydrochloric acid, thereafter with an aqueous alkaline solution, and subsequently acidifying. Recrystallization from a benzene-alcohol mixture results in a relatively pure product as a solid.

The following example is given to illustrate the present invention, but is not to be construed as limiting.

Example

A mixture of 45 grams (0.16 mole) of 2-acetyl-4-chlorophenyl benzoate and 23 grams (0.17 mole) of aluminum chloride was heated to 155° C. for 30 minutes and thereafter to 185° C. for 1 hour. This reaction mixture was then cooled, pulverized, and added to an ice-hydrochloric acid mixture. The solid product was removed by filtration, washed with dilute hydrochloric acid and then washed with Skellysolve. Extraction of the organic solid was made with dilute aqueous sodium hydroxide and the organic solid recovered by acidification of the alkaline solution with hydrochloric acid. Recrystallization from a benzene-alcohol mixture yielded 6 grams of 2-acetyl-6-benzoyl-4-chlorophenol, a pale yellow solid having a melting point of 148.3–149.2° C.

Analysis.—Calculated: C, 65.58; H, 4.04; Cl, 12.91. Found: C, 65.30; H, 3.96; Cl, 12.65.

The 2-acetyl-4-chlorophenyl benzoate used as the starting material in the above example may be prepared as follows: 153 grams (0.9 mole) of 2-hydroxy-5-chloroacetophenone, 140 grams (1.0 mole) of benzoyl chloride, 400 grams of 10 percent sodium hydroxide, and 750 milliliters of water are reacted at or about 25° C. for a period of twelve to sixteen hours. The mixture is then treated with benzene and the white crystals of 2-acetyl-4-chlorophenyl benzoate are crystallized from the reaction mixture and have a melting point of 52.4–53.5° C. Similarly, other starting 2-acyl-4-halophenyl benzoates, such as, for example, 2-acetyl-4-bromophenyl benzoate, 2-propionyl-4-chlorophenyl benzoate, 2-butyryl-4-bromophenyl benzoate, 2-propionyl-4-bromophenyl benzoate, may be prepared from appropriately substituted acetophenones.

In a manner similar to that of the foregoing example, other substituted phenols, such as, for example, 2-acetyl-6-benzoyl-4-bromophenol,
2-propionyl-6-benzoyl-4-chlorophenol,
2-propionyl-6-benzoyl-4-bromophenol,
2-(2-methylpropionyl)-6-benzoyl-4-chlorophenol,
2-(2-methylpropionyl)-6-benzoyl-4-bromophenol,
2-butyryl-6-benzoyl-4-chlorophenol,
2-butyryl-6-benzoyl-4-bromophenol,
2-valeryl-6-benzoyl-4-chlorophenol,
2-valeryl-6-benzoyl-4-bromophenol,
2-(2-methylbutyryl)-6-benzoyl-4-chlorophenol,
2-(2-methylbutyryl)-6-benzoyl-4-bromophenol,
2-(3-methylbutyryl)-6-benzoyl-4-chlorophenol,
2-(3-methylbutyryl)-6-benzoyl-4-bromophenol,
2-(2,2-dimethyl propionyl)-6-benzoyl-4-chlorophenol, and
2-(2,2-dimethyl propionyl)-6-benzoyl-4-bromophenol, may be prepared.

Various modifications may be made in the present invention without departing from the spirit or scope thereof, and it is to be understood that we limit ourselves only as defined in the appended claims.

We claim:
1. Organic compounds having the general formula:

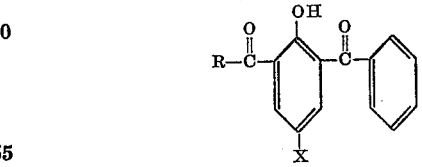

wherein X is a halogen selected from a group consisting of chlorine and bromine, and R is a lower alkyl radical containing from 1 to 4 carbon atoms.
2. 2-acetyl-6-benzoyl-4-chlorophenol.

References Cited in the file of this patent
UNITED STATES PATENTS 2,773,903    Hardy et al. _____ Dec. 11, 1956

OTHER REFERENCES

Wittig et al.: Chem. Abstracts, vol. 25, page 3634 (1931).